March 24, 1925.

C. P. GRIMES 1,530,825

AIR CLEANER FOR INTERNAL COMBUSTION ENGINES

Filed Jan. 6, 1925

INVENTOR.
Charles P. Grimes
BY Parsons & Bodell
ATTORNEYS.

Patented Mar. 24, 1925.

1,530,825

UNITED STATES PATENT OFFICE.

CHARLES P. GRIMES, OF SYRACUSE, NEW YORK.

AIR CLEANER FOR INTERNAL-COMBUSTION ENGINES.

Application filed January 6, 1925. Serial No. 869.

*To all whom it may concern:*

Be it known that I, CHARLES P. GRIMES, a citizen of the United States, and a resident of Syracuse, in the county of Onondaga and State of New York, have invented a certain new and useful Air Cleaner for Internal-Combustion Engines, of which the following is a specification.

This invention relates to air cleaners for the air intake pipes of carbureters of internal combustion engines and particularly air cleaners having a rotating draft operated separator, and has for its object a particularly simple and efficient motor means for actuating the rotatable separator when the draft of air through the casing of the cleaner and through the carbureter intake pipe is not sufficient to rotate the separator.

This invention consists in the novel features and in the combinations and constructions hereinafter set forth and claimed.

In describing this invention, reference is had to the accompanying drawing in which like characters designate corresponding parts in all the views.

Figure 1:
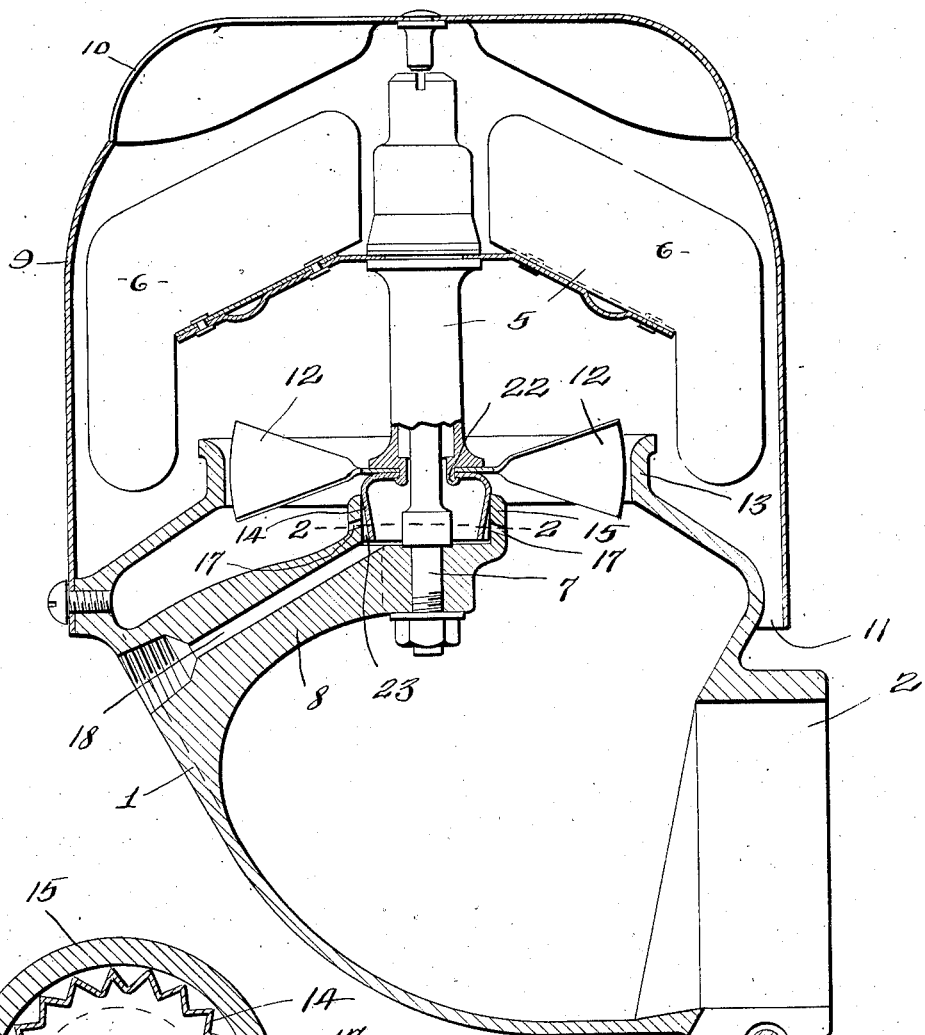
Figure 1 is an enlarged sectional view of an air cleaner embodying my invention.
Figure 2:
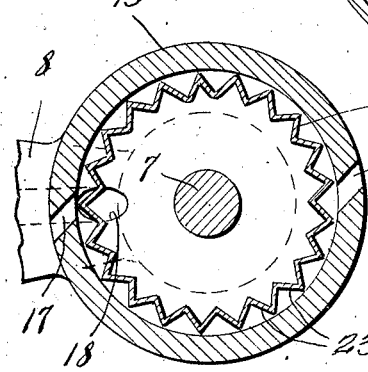
Figure 2 is an enlarged sectional view on line 2—2, Figure 1.
Figure 3:
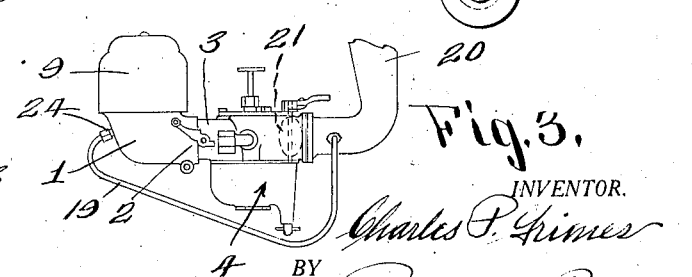
Figure 3 is a diagrammatic view illustrating the relative arrangement of this air cleaner and the internal combustion engine.

In air cleaners which employ a rotatable separator to separate dust and relatively heavy particles from the ingoing air, the rotatable separator has heretofore been actuated by the draft of air passing through the casing of the cleaner. With the engine running at a low speed and with the throttle nearly closed, the draft of air through the air cleaner is not sufficient to rotate the separator and hence the dust is not separated from the air.

This invention has for its object an additional means operated by the vacuum conditions within the intake manifold or above the throttle valve for rotating the separator particularly when the throttle is nearly closed and hence the draft of the incoming air is not sufficient to rotate the separator.

When the throttle is partly closed or nearly closed and hence the engine running slowly, the draft through the carbureter is decreased to such an extent that it is not sufficient to turn the separator within the air cleaner and the vacuum in the manifold or above the throttle is increased.

This air cleaner comprises generally a casing mountable on the intake pipe of the carbureter, a rotatable separator mounted in the casing and arranged to be rotated by the draft of air passing through the casing into the carbureter in order to separate dust and heavy particles from the air by the centrifugal action, and a motor operated by the suction within the intake manifold when the throttle is nearly closed, said motor being arranged to actuate the separator when the draft of air is not sufficient to effectively actuate the separator.

1 designates the casing having a coupling 2 at one end for connection to the intake pipe 3 of the carbureter 4.

5 is a rotatable separator usually mounted in vertical position in the casing 1 and comprising a central hub and blades 6 radiating from the hub. The hub is here shown as tubular and as mounted upon a stud or shaft 7 carried by an inwardly extending bracket 8 in the casing 1, the stud thrusting against the bearing, not shown, in the upper end of the hub. The separator is inclosed in a suitable cap 9 secured to the casing 1 in any suitable manner, this cap 9 having intake openings 10 and a marginal outlet 11 for the dust separated from the air drawn in through the inlets 10. The separator 5 is also usually provided with additional propeller blades 12 located within a throat 13 below the blades 6 and above the outlet 11.

In operation, the air drawn through the cap 9 and casing 1 during the suction strokes of the pistons of the engine, causes the separator to rotate and the heavy particles as dust, etc., in the air is separated from the air by the centrifugal action of the blade 6 and is passed out through the outlet 11.

The construction thus far described per se forms no part of this invention.

This invention comprises a suction operated motor for actuating the separator when the draft is not sufficient to effectively actuate the separator.

The motor as here shown comprises a turbine including a rotor 14 mounted on the lower end of the hub of the separator, a casing 15 surrounding the rotor and having air inlets 17 opening into the case and a suction conduit 18 communicating with the bottom of the turbine casing 15 and connected as by a pipe 19 to the intake manifold 20 above the throttle valve 21, that is, between the throttle valve and the engine cylinder.

The rotor 14 as here shown is in the form of an inverted sheet metal cup having its bottom secured to the lower end of the hub of the separator 5, the hub having a projecting tubular neck 22 at its lower end for entering the central hole in the bottom of the turbine rotor 14, this tubular neck being riveted or spread onto the inner face of the bottom of the cup or rotor 14.

Preferably, the inner ends of the blades 12 are interposed between the bottom of the cup or rotor 14 and the end of the hub of the separator 5 and are hence held in position by the riveted tubular neck 22.

The blades 23 on the rotor 14 of the turbine are preferably provided by corrugating the peripheral wall of the turbine. The air inlets 17 extend tangentially. The suction conduit 19 which opens through the bottom of the turbine case 15, as here illustrated, extends lengthwise of the bracket 8 and is provided at its outer end with a threaded counter sink for receiving a coupling 24 at one end of the suction pipe 19. The other end of the suction pipe 19 is here shown as coupled to the manifold 20, but it may be coupled to communicate with the manifold or carbureter at any point between the throttle valve 21 and the engine cylinders.

In operation, when the throttle 21 is nearly closed and the draft of air through the case 1 is the least, the vacuum within the manifold is greatest and when the throttle is open more or less, the vacuum is less within the manifold and the draft conditions greater.

Under ordinary running, the draft is sufficient to rotate the separator but when the engine is throttled, say down to 10 miles per hour in high gear, the draft may be insufficient to actuate the separator of the air cleaner, but the vacuum within the manifold increases and is sufficient to rotate the separator to cause it to separate the dust from the air by the centrifugal action of the separator.

This air cleaner is particularly advantageous in that the separator is actuated effectively under all running conditions.

What I claim is:

1. In an air cleaner for internal combustion engines, the combination of a casing through which the air is drawn, a rotatable separator in the casing and means actuated by the suction in the manifold to which the air cleaner is connected for actuating the separator independently of the draft of air passing through the casing.

2. In an air cleaner for internal combustion engines, the combination of a casing through which the air is drawn, a rotatable separator in the casing constructed to be rotated by the draft of air through the casing and additional means for actuating the separator independent of the draft of air, said additional means being constructed to be operated by the suction in the manifold to which the air cleaner is connected.

3. In an air cleaner for internal combustion engines, the combination of a casing through which the air is drawn, a rotatable separator in the casing constructed to be operated by the draft of air passing through the casing and a suction operated motor associated with the separator.

4. In an air cleaner for internal combustion engines, the combination of a casing through which the air is drawn, a rotatable separator in the casing, the separator having blades arranged to be actuated by the draft of air passing through the casing and a suction operated turbine mounted concentric with the separator and connected thereto to rotate therewith.

5. In an air cleaner for internal combustion engines, the combination of a casing through which the air is drawn, and a rotatable separator mounted in the casing and having blades arranged to be actuated by the draft of air passing through the casing, of a turbine including a rotor mounted concentric with the separator and connected thereto to rotate therewith and a casing around the rotor having an inlet for air and a suction conduit constituting an outlet for the air.

6. The combination with an intake manifold of an internal combustion engine, a carbureter having an intake pipe, an air cleaner mounted on the intake pipe comprising a casing, and a rotatable separator in the casing, of a suction operated motor associated with the separator and a conduit connecting such motor and the intake manifold.

7. The combination with a manifold, of an internal combustion engine, a carbureter having an air intake pipe and an air cleaner comprising a casing mounted on said pipe a rotatable separator mounted in the casing, of a turbine including a rotor connected to the separator to rotate therewith and a casing around the rotor formed with an inlet for air and an outlet leading from the turbine casing and a pipe connecting the outlet and the manifold.

8. The combination with a manifold of an internal combustion engine and a carbureter having an intake pipe, of an air cleaner comprising a casing mounted on the intake pipe, a separator mounted in the casing and comprising a hub and blades carried by the hub and adapted to be rotated by the draft of air through the casing, a turbine including a rotor mounted on said hub and a casing surrounding the rotor and having an inlet for air and a suction conduit forming an outlet for the air taken in through the inlet and a conduit connecting the suction conduit and the manifold.

9. The combination of an intake manifold of an internal combustion engine, a carbureter having an intake pipe and an air cleaner including a casing mounted on said pipe and a rotatable separator mounted in the casing an including means arranged to be actuated by the draft of air passing through the casing and means for rotating the separator operable by the vacuum in the intake manifold, the latter means including a casing and a suction conduit connecting the last mentioned casing and the intake manifold.

In testimony whereof, I have hereunto signed my name, at Syracuse, in the county of Onondaga, and State of New York, this 30th day of December, 1924.

CHARLES P. GRIMES.